April 18, 1961 P. M. THOMPSON ET AL 2,980,845

CURRENT OVERLOAD PROTECTIVE CIRCUITS

Filed April 13, 1959 3 Sheets-Sheet 1

INVENTORS
PHILIP M. THOMPSON
COLIN A. FRANKLIN
BY Smart & Biggar
ATTORNEYS.

April 18, 1961 P. M. THOMPSON ET AL 2,980,845

CURRENT OVERLOAD PROTECTIVE CIRCUITS

Filed April 13, 1959 3 Sheets-Sheet 2

INVENTORS
PHILIP M. THOMPSON
COLIN A. FRANKLIN
BY Smart & Biggar
ATTORNEYS.

INVENTORS
PHILIP M. THOMPSON
COLIN A. FRANKLIN
BY Smart & Biggar
ATTORNEYS.

2,980,845

CURRENT OVERLOAD PROTECTIVE CIRCUITS

Philip M. Thompson, Cumberland, Ontario, and Colin A. Franklin, Eastview, Ontario, Canada, assignors to Her Majesty the Queen in the right of Canada as represented by the Minister of National Defence Filed Apr. 13, 1959, Ser. No. 806,053

9 Claims. (Cl. 323—22)

The present invention relates to an overload protection circuit for a transistor amplifier.

Transistors are often used as variable impedance devices and are called upon to pass a current from emitter to collector in dependence upon a current signal supplied to the base. Where the current capacity of a single transistor is insufficient, it is common practice to connect a number of transistors in parallel. The parallel combination of transistors is then capable of handling the required current.

Known protective devices for limiting the current passed by such a group of transistors have sensed the total current being passed by the group and adjusted the impedance of these transistors to keep the total current less than the total of the permissible currents of each transistor. If one transistor has characteristics varying from any of the other transistors it is possible that a single transistor will conduct an excess amount of current while the remaining transistors are operated well within their limits. This situation would not be detected by known protective circuits and the transistor passing an excessive current may be destroyed, thereby increasing the current carried by the remaining transistors and increasing the risk of damaging the remaining transistors.

A typical application wherein a number of transistors are used as a variable impedance device and are called upon to pass large currents is as a series voltage regulator for a power supply. In such a voltage regulator a number of transistors have their emitters, bases and collectors connected in parallel and have a source of potential connected in series with their emitters and collectors and the output terminals of the power regulator. The voltage difference between the output terminals is compared with the voltage developed across a reference source, and this difference in voltage is applied via a suitable current amplifier to the bases of the transistors. The effective impedance between emitter and collector of the transistors is thus varied, and a regulation of the output voltage between the output terminals is affected. If one of the transistors in this circuit has a markedly different characteristic from any of the other transistors then one transistor may pass an emitter to collector current greatly in excess of that of the remaining transistors and may be destroyed.

According to the present invention such a danger is avoided by providing an overload protection circuit for a plurality of transistors having an emitter, a base and a collector which comprises a compensating transistor having an emitter, a base and a collector, means adapted to bias said compensating transistor beyond cutoff, means responsive to excessive emitter current of anyone of the plurality of transistors to reduce the bias on the compensating transistor and cause conduction of said compensating transistor, and means responsive to conduction of the compensating transistor to reduce the signal input to the plurality of transistors thereby decreasing the emitter current of the plurality of transistors.

Protection against an excessive voltage drop appearing between the emitter and collector of anyone of the plurality of transistors can be achieved by connecting an avalanche mode diode and a resistor in parallel between the collector and emitter of the transistor in such a direction that an excessive voltage from collector to emitter will cause conduction of the diode in the avalanche mode and prevent damage to the transistor.

In drawings which illustrate a device to which the present invention is applicable and embodiments of the invention:

Figure 1:
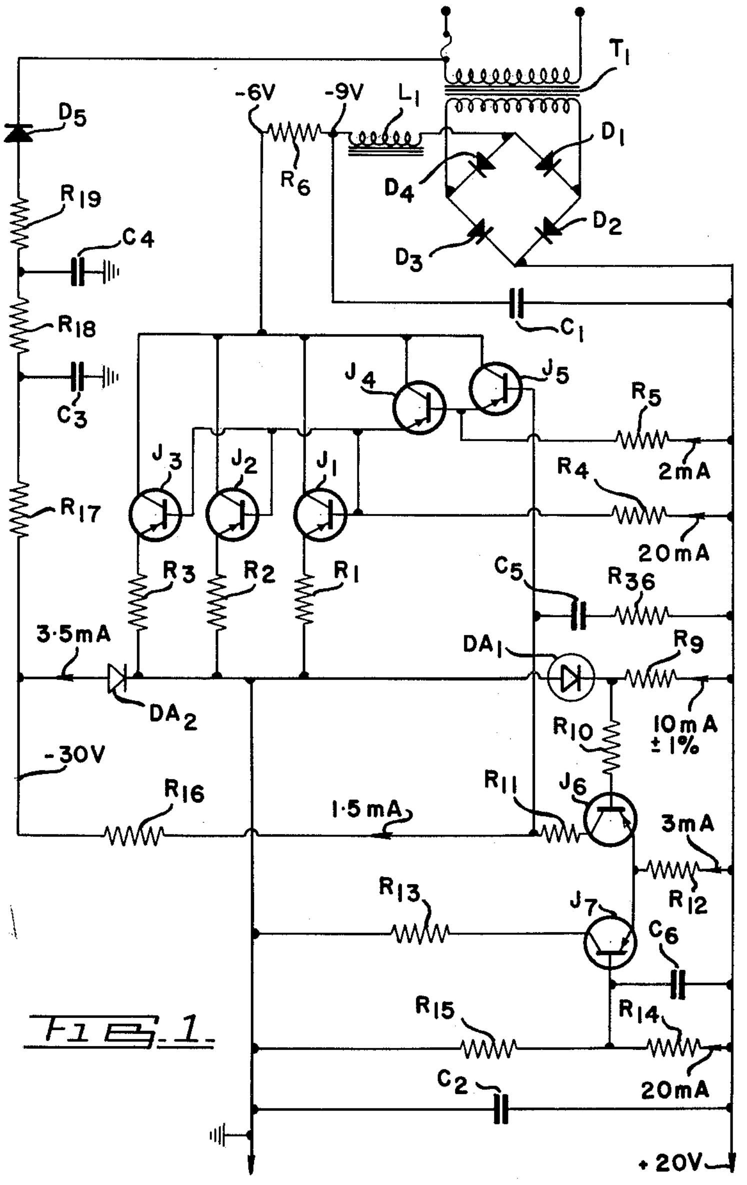
Figure 1 is a schematic diagram showing a voltage regulated power supply circuit using series impedance transistors having their emitters and collectors connected in series between the output terminals of the power supply and in series with the rectifier.

Figure 1 is a schematic diagram of a voltage regulated power supply circuit. In the conventional manner a voltage provided from an alternating current source is transformed by a transformer T1 and rectified by a bridge rectifier consisting of diodes D1, D2, D3 and D4. The output from the rectifier is filtered by inductance L1, and capacitor C1 and is provided to a pair of output terminals. In order to regulate the output voltage from this power supply a voltage divider consisting of R14 and R15 is connected across the output terminal. The voltage between R14 and R15 is compared with the voltage drop across a reference source comprising avalanche diode DA1 and the difference between these two voltages is amplified by the difference amplifier formed by transistors J6 and J7. This difference voltage is applied to the base of transistor amplifier J5 which is coupled to transistor amplifier J4. Amplifier J4 supplies a signal to the base of transistors J1, J2 and J3 which is effective to vary the conductivity of these transistors. The voltage appearing at the output terminals is thus maintained at a constant value by reference to the voltage drop across avalanche diode DA1. Resistors R1, R2 and R3 are connected in series with the emitters of the three transistors J1, J2 and J3 in order to help equalize their currents.

Figure 2:
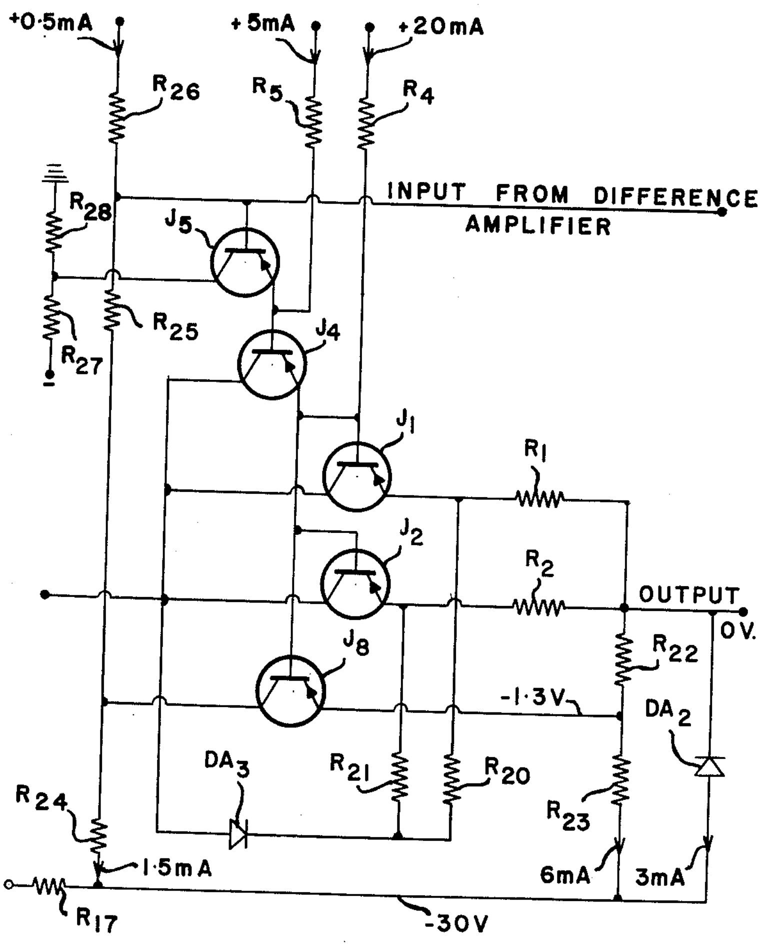
Figure 2 is a schematic diagram showing an embodiment according to the invention.

Figure 2 illustrates an embodiment of the invention in which a transistor J8 is added to a circuit similar to the circuit shown in Figure 1, in order to protect the transistors J1 and J2. The transistors J1 and J2 are used as variable impedance devices to regulate the voltage supplied to a pair of output terminals. As before the signal applied to the bases of transistors J1 and J2 by the transistor J4 operates to vary the effective impedance between the collector and emitter of each transistor and thereby vary the amount of current being passed by each transistor. The base of transistor J8 is connected in parallel with the base of transistors J1 and J2. The emitter of transistor J8 is connected via resistor R22 to the common connection of the output circuits of transistors J1 and J2 and the emitter of transistor J8 is also connected to a negative source of bias potential via resistor R23. As illustrated in Figure 2 a bias of −1.3 volts is applied from the voltage divider consisting of resistors R22 and R23 to the emitter of transistor J8 and the transistor is thereby cut off. The collector of J8 is connected via resistor 25 to the base of transistor J5.

If either transistor J1 or transistor J2 passes an excessive amount of current a voltage will be developed across the corresponding resistance R1 or R2 which voltage will appear at the base of transistors J1, J2 and J8. This voltage if it is sufficient to overcome the bias between the base and emitter of transistor J8 will cause this transistor to conduct with the result that a current signal will be passed from transistor J8 through resistor 25 to the input of transistor J5. This current signal is in opposition to the input signal from the difference amplifier and consequently reduces the drive provided to the bases of transistors J1, J2 and J8. This results in a decrease in the current being passed by transistors J1 and J2 thereby reducing the current to a safe value.

If either of the output transistors J1 or J2 passes an excessive current due to any cause the transistor J8 will reduce that excessive current. Any number of output transistors could be parallel connected, and provided with this protection by this single transistor J8.

The output transistors J1 and J2 may be protected from an excessive voltage appearing between their collectors and their emitters by connecting an avalance diode DA3, in series with resistors R21 and R20, between these elements.

Figure 3:
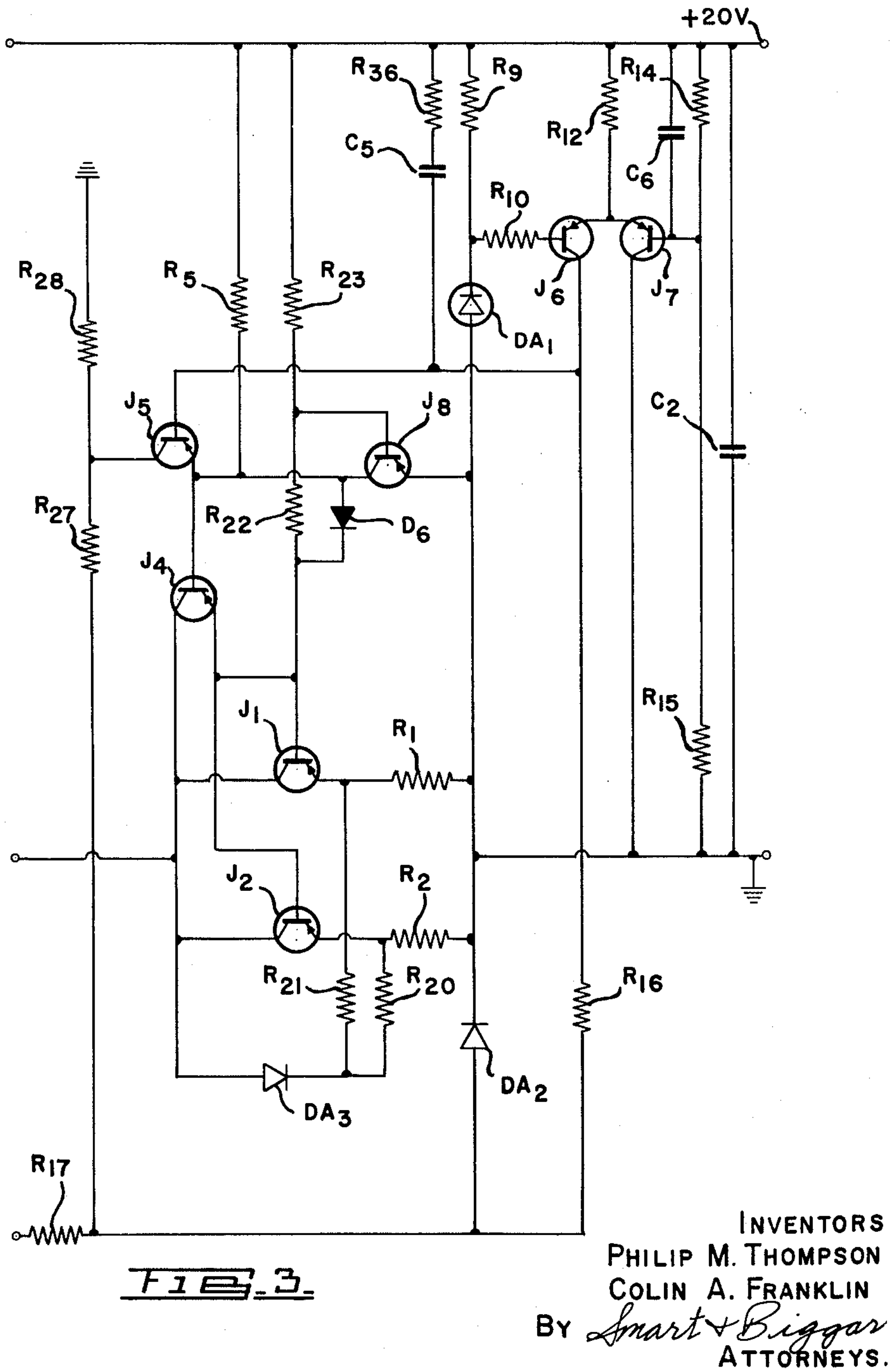
Figure 3 is a schematic diagram showing a preferred embodiment according to the invention.

A preferred embodiment of this invention is illustrated in Figure 3. This embodiment is also designed as a regulator circuit for use in conjunction with the transistor power supply shown in Figure 1. The input to the regulator is from the rectifier and smoothing circuit.

The basic difference between Figure 3 and Figure 2 is that the regulating transistor J8 has its base and collector connected in a somewhat different manner. This of course does not affect the basic operation of the regulator circuit.

The cut-off bias for transistor J8 is now developed across the voltage dividing network consisting of resistors R23 and R22, where R23 is considerably larger than R22. The collector of transistor J8 is connected to the emitter of transistor J5, and a diode D6 is connected between the collector of transistor J8 and the base of transistors J1 and J2. If either transistor J1 or J2 passes an excessive current, a voltage will be developed across the corresponding resistor R1 or R2 which voltage will appear on the common connection of the bases of the transistors J1 and J2. This voltage will be sufficient to overcome the bias applied to transistor J8, and turn transistor J8 on. The current passed by the collector of transistor J8 is applied to the emitter of transistor J5, and consequently limits the signal which drives transistors J1 and J2 through the emitter follower transistor J4.

When transistor J8 is connected as illustrated in Figure 3, an overload can result in transistors J1 and J2 being suddenly cut-off. The voltage regulator will function to maintain the output voltage at its proper level, until a current overload is experienced by transistors J1 and J2, then the output voltage will decrease; and the current through J1 and J2 will be reduced, thus preventing excessive dissipation in these transistors.

If the load connected to the output terminals is a short circuit, then the bias applied to transistor J8 and developed from resistors R23 and R22 is removed. However, the voltage developed across the resistors R1 and R2 and applied to the base of J8, will not disappear. The transistor J8 will thus be driven very strongly. Transistor J8 then saturates and applies a maximum current output, resulting in turning off transistors J1 and J2 very quickly.

The collector of transistor J8 may be connected directly to the base of transistor J5, which has an advantage in that the negative feed-back supplied by transistor J8 when it is conducting will in effect experience two stages of amplification before reaching the base of transistors J1 and J2. However, it is preferred to connect the collector of transistor J8 to the emitter of transistor J5 because this is a high-current point and, what is more important, the leakage currents of the transistors will tend to cancel, and also a further diode would be required between the collector of J8 and the emitter of J5.

Transistor J8 will be subjected to the same ambient temperature as the transistors J1 and J2. In addition, the resistors R1 and R2 and the emitters of the transistors J1 and J2 effectively connected in parallel with the emitter of J8 and R22, and also the emitter junctions are in the same direction. Thus the operation of the transistor J8 will be substantially non-sensitive to temperature variations. Any temperature which would reduce the work function of the base-emitter junction of transistors J1 and J2 to endanger them would similarly reduce the work function of the base-emitter junction of transistor J8. The maximum load current which would cause conduction of transistor J8 would therefore be relatively independent of temperature.

Diode D6 is normally non-conducting and will conduct only when the output terminals are subjected to heavy overload or are short circuited. Under these conditions, transistor J8 saturates, and passes a high current; the transistor J8 is in no danger itself because under these conditions, the voltage existing between the collector and emitter is of the order of a volt, so that little power is dissipated. Under high temperature conditions, some transistors may pass a leakage current as high as 10 milliamps. If the current gain of transistors J1 and J2 is, for example, 150 (which under high temperature conditions is a possible figure), then for a short circuit across the output terminals the current through each of transistors J1 and J2 would be 1.5 amps in the absence of diode D6. This situation can lead to "thermal runaway." This condition would normally be avoided either by limiting the ambient temperature, or using the more expensive transistors which have much smaller leakage currents. When the diode D6 is connected as illustrated in Figure 3, the leakage currents are permitted to flow through diode D6 directly to the collector of transistor J8.

The resistors R20 and R21 provide a path for current to flow from the output to the collectors of transistors J1 and J2 other than through the output transistors. This is often necessary when a non-linear load is connected between the output terminals. Diode DA3 may be replaced by a short circuit if the regulator is not required to regulate over a wide range of current (e.g. more than 5:1).

What we claim as our invention is:

1. An overload protection circuit for a plurality of transistors each having an emitter, a base and a collector comprising a compensating transistor having an emitter, a base and a collector; means adapted to bias said compensating transistor beyond cutoff; means responsive to excessive emitter current of anyone of said plurality of transistors to reduce the bias on said compensating transistor and cause conduction of said compensating transistor, and means responsive to conduction of said compensating transistor to reduce the signal input to said plurality of transistors thereby decreasing the emitter currents of said plurality of transistors.

2. An overload protection circuit according to claim 9 wherein said transistors are PNP junction transistors.

3. An overload protection circuit according to claim 9 wherein the base of said compensating transistor is connected to the bases of each of said plurality of transistors, the emitter of said compensating transistor is connected to the emitter of each of said plurality of transistors through series resistances and to a source of bias potential through a bias resistance, and the collector of said compensating transistor is connected to said means responsive to conduction of said compensating transistor to reduce the signal input to said plurality of transistors.

4. An overload protection circuit according to claim 3 wherein said means responsive to conduction of said compensating transistor comprises current amplification means connected between the collector of said compensating transistor and the bases of said plurality of transistors.

5. An overload protection circuit according to claim 9 wherein a first resistor is connected between the base of one of said plurality of transistors and the base of said compensating transistor and a second resistor is connected between the base of said compensating transistor and a source of bias potential, a series resistor is connected between the emitter of each of said plurality of transistors and the emitter of said compensating transistor and the collector of said compensating transistor is connected to said means responsive to conduction of said compensating transistor.

6. An overload protection circuit according to claim 5 wherein said means responsive to conduction of said compensating transistor comprises current amplification means connected between the collector of said compensating transistor and the base of each of said plurality of transistors.

7. An overload protection circuit according to claim 9 and including an avalanche mode diode and a resistor connected between the collector of one of a plurality of transistors and the emitter of said one of said plurality of transistors.

8. An overload protection circuit according to claim 9 and including a diode connected between the base of one of said plurality of transistors and the collector of said compensating transistor and adapted to conduct leakage current from the base of said one of said plurality of transistors to the collector of said compensating transistor.

9. An overload protection circuit as claimed in claim 1, wherein the said plurality of transistors have their emitter-collector paths in parallel.

References Cited in the file of this patent

UNITED STATES PATENTS

| | | |
|---|---|---|
| 2,776,382 | Jensen | Jan. 1, 1957 |
| 2,789,254 | Bodle et al. | Apr. 16, 1957 |
| 2,904,742 | Chase | Sept. 15, 1959 |